United States Patent [19]

Kiovsky

[11] 4,102,978
[45] Jul. 25, 1978

[54] PROCESS FOR PRODUCING ALUMINA CATALYST CARRIERS

[75] Inventor: Joseph R. Kiovsky, Kent, Ohio

[73] Assignee: Norton Company, Worcester, Mass.

[21] Appl. No.: 798,887

[22] Filed: May 20, 1977

Related U.S. Application Data

[63] Continuation-in-part of Ser. No. 630,317, Nov. 10, 1975, abandoned, which is a continuation-in-part of Ser. No. 393,801, Sep. 4, 1973, abandoned.

[51] Int. Cl.$^2$ ............................................. C01F 7/02
[52] U.S. Cl. ............................... 423/626; 423/628; 423/631; 423/630; 252/463
[58] Field of Search ............... 423/625, 626, 628, 630, 423/631; 252/463

[56] References Cited

U.S. PATENT DOCUMENTS

| 3,003,919 | 10/1961 | Broge | 423/630 |
|---|---|---|---|
| 3,227,521 | 1/1966 | Carithers et al. | 423/625 |
| 3,268,295 | 8/1966 | Armbrust et al. | 423/626 |
| 3,353,910 | 11/1967 | Cornelius et al. | 423/626 |
| 3,417,028 | 12/1968 | Montgomery et al. | 423/630 |
| 3,532,457 | 10/1970 | Koepernik | 252/463 |
| 3,630,670 | 12/1971 | Bell et al. | 423/626 |
| 3,714,343 | 1/1973 | Sato et al. | 423/630 |
| 3,850,849 | 11/1974 | Kiovsky et al. | 423/626 |
| 3,853,789 | 12/1974 | Warthen et al. | 423/628 |
| 3,894,963 | 7/1975 | Gerdes et al. | 423/626 |
| 3,945,945 | 3/1976 | Kiovsky et al. | 423/626 |

*Primary Examiner*—Herbert T. Carter
*Attorney, Agent, or Firm*—Rufus M. Franklin

[57] ABSTRACT

Alumina catalyst carriers are produced by bonding pre-fired gibbsite with microcrystalline boehmite. Superior strength of the product is achieved by use of gibbsite fired to an L.O.I. at 1000° C of 8% or less, or preferably less than 4%.

1 Claim, No Drawings

PROCESS FOR PRODUCING ALUMINA CATALYST CARRIERS

BACKGROUND OF THE INVENTION

This application is a continuation-in-part of my co-pending application Ser. No. 630,317, filed Nov. 10, 1975, which in turn was a continuation-in-part of Ser. No. 393,801, filed Sept. 4, 1973, both now abandoned.

This invention relates to novel alumina catalyst and catalyst carrier bodies of intermediate to high surface area, having improved high temperature mechanical properties, and to a method for their production. In copending U.S. application Ser. No. 243,835, filed Apr. 13, 1972, is disclosed an alumina body of high or intermediate surface area made from acid activated microcrystalline boehmite as a bond former for boehmite or gibbsite. While such bodies have novel and useful properties, they suffer from a lack of mechanical strength when subjected intermittently or for long periods to temperatures of 980° C and higher as can occur, for example, when the bodies are used in automotive exhaust catalyst composites. The present invention provides a product and process for overcoming this deficiency of the bodies made from microcrystalline boehmite and from gibbsite.

SUMMARY OF THE INVENTION

We have found that the high temperature properties of alumina bodies made from gibbsite can be improved by employing pre-fired gibbsite in the mix instead of gibbsite, as such. Gibbsite, as received, in commerce, has a typical loss of weight on ignition to 1000° C of about 35% (due to loss of water). In order to prepare it for use in the present invention the gibbsite is fired to reduce the loss on ignition to below 8%, when the material is fired to 1000° C (under conditions specified hereinafter), and preferably to 4%. The particular temperature of firing to reach the desired L.O.I. depends on the firing conditions and the residence time, but the range of firing temperature in any case being from 350° to 1000° C.

In producing the bodies of this invention, from 30 to 80%, by weight, of the mix solids (i.e. excluding added water and acid) can be the pre-fired gibbsite, described above, which contains boehmite and chi alumina and may contain some gamma alumina, and at least 20% by weight of the mix solids will be microcrystalline boehmite as hereinafter defined. From 0 to 50% of the mix may be desensitized microcrystalline boehmite, as hereinafter defined.

Microcrystalline boehmites, as herein defined, are characterized by their ability to be dispersed by certain monobasic acids. The dispersability of any given sample of boehmite, and thus its active microcrystallinity, can be determined by treating the sample with dilute nitric acid, centrifuging the sample to separate the coarser crystals and agglomerates from the liquid, and measuring the light transmittance of the liquid. By the specific test described below the transmittance for active microcrystalline boehmite is less than 50% and preferably less than 20%.

The method for determining the transmittance is as follows:

1. Weigh a 3.0 gram sample into a 150 ml. beaker, add 25 ml. of 0.5 normal $HNO_3$, add a stirring bar and cover with a watch glass.

2. Place the beaker on a magnetic stirrer and stir for 10 minutes at a speed of 900 to 1100 rpm.

3. Transfer the contents of the beaker to a centrifuge bottle and dilute with distilled water to bring the volume to 90 ml.

4. Centrifuge the sample in a $9\frac{7}{8}$ inch radius centrifuge at 1000 rpm for 20 minutes.

5. Measure the transmittance of the supernatent liquid in a 10 mm test cell at a wavelength of 450 millimicrons, as a percent of the transmittance of distilled water.

Heat treatment of microcrystalline boehmite results in a loss of water which, as it progresses, gradually desensitizes the boehmite to dispersion by acid by removing the chemically combined hydroxyls from between the microcrystalline boehmite platelets, causing shrinkage, densification, and increased bonding between the platelets. Such boehmites we call desensitized microcrystalline boehmite. We have found that heat treatment for from 5 minutes to 2 hours, at 250° C or higher converts the microcrystalline boehmite to a desensitized form, having a transmittance, T, by the test described above, of higher than 50%.

To form the alumina bodies of this invention the microcrystalline boehmite, plus the pre-fired gibbsite, plus additional alumina, if desired, in the form of desensitized microcrystalline boehmite are mixed with from 2 to 10% by weight of a monobasic acid such as nitric, formic, hydrochloric, (or any monobasic acid having an anion no larger than that of propanoic acid), together with from 80 to 120 parts of water per 100 parts of the mixed aluminas. The ingredients are mixed in a short intensive mixing step so as to produce a free flowing particulate material after mixing rather than a paste or dough. The mix is then extruded or otherwise formed to shape by pressure, dried to remove 80% or more of the mixing water added, and fired at a temperature of from 300 to 1200° C, a preferred firing range being 625 to 1200° C. The resulting products show a surface area (B.E.T. method) of from 70 to 220 square meters per gram, a pore volume by water adsorption of from 60 to 85% by weight, preferably 75 to 85 weight percent, a crushing strength for 0.1 inch diameter pellets of greater than 7 pounds, an attrition loss (hereinafter defined) of less than 5 weight percent preferably less than 4%, an abrasion loss (as hereinafter defined) of less than 0.22 weight percent, preferably less than 0.15%, and a purity of greater than 99.5% $Al_2O_3$, exclusive of water, said alumina being present in the form of gamma, chi, kappa, delta, theta, and alpha phases and mixtures thereof; the preferred embodiments containing no theta or alpha alumina.

An inherent characteristic of the products made according to this invention (and containing no alpha alumina) is that they will contain at least one form of alumina selected from the group consisting of chi and kappa alumina and at least one form of alumina selected from the gamma, delta, and theta forms. But preferably no alpha or theta alumina will be present.

The chi and kappa forms are inherently produced when the mix containing pre-fired gibbsite is fired. Only gibbsite (or pre-fired gibbsite) will produce these forms. The gamma and delta forms, and possibly some theta, will come from the boehmite (some also coming from the gibbsite).

DESCRIPTIONS OF SPECIFIC EMBODIMENTS OF INVENTION

Example I

This example illustrates the effect of employing pre-fired gibbsite according to the present invention instead of gibbsite.

Illustrative of the present invention a quantity of gibbsite, which passes through a 325 mesh sieve, was fired to a temperature of 650° C to produce a powder with a loss on ignition between 350° and 1000° C of 4.6 weight percent and which contained only chi and gamma alumina by X-ray diffraction analysis. Two extrusion mixes were made, one using the fired gibbsite powder, and the other using gibbsite (alpha alumina trihydrate). In Mix A, the mix illustrating the invention, the amount of pre-fired gibbsite used was less than the amount of gibbsite used in Mix B, so that the amount of $Al_2O_3$ in the final products contributed by the gibbsite or pre-fired gibbsite would be the same. The calculation was made based on a 35% by weight water content (L.O.I.) for the trihydrate (gibbsite).

The composition of the mixes was as follows (exclusive of water):

| | | |
|---|---|---|
| Gibbsite | | 54.2 |
| Pre-fired gibbsite | 42.1 | 0 |
| Microcrystalline boehmite | 28.5 | 23.4 |
| Desensitized Microcrystalline boehmite | 29.5 | 24.3 |
| Concentrated Nitric Acid | 7.0 | 8.0 |

The mixes with sufficient water for proper formation (80 to 120 parts per 100 parts of mix), were blended to form a free flowing mix, extruded to form 0.1 inch diameter pellets (as fired), dried and fired at 870° C (1600° F).

The properties of the first pellets were as follows (samples 14282 and 14287):

| | Invention Mix A | Mix B |
|---|---|---|
| Fired Diameter | 0.111 | 0.109 |
| Packing Density (lbs./ft.$^3$) | 35.6 | 32.5 |
| Attrition loss (wt. %) | 4.3 | 8.69 |
| Abrasion loss (wt. %) | 0.17 | 0.52 |
| Crushing strength (pounds) | 7.8 | 5.9 |
| Surface area (m$^2$/gm) | 91.4 | 93.1 |
| Water adsorption (wt. %) | 77.5 | 85.2 |

The data shows a significant improvement in crushing strength, abrasion loss, and attrition loss for the mix of this invention (mix A), with no significant loss in surface area or water adsorption as compared to the product made from unfired gibbsite. X-ray analysis of the products showed them to be mixtures of kappa and delta aluminas.

Example II

This example employs a pre-fired gibbsite and microcrystalline boehmite as the only sources of alumina. A pre-fired gibbsite (4.0% L.O.I.) 70%, and MCB, 30%, were mixed with 8% concentrated nitric acid and sufficient water for mixing, formed into pellets, dried, and fired to 650° C. Such pellets retained their strength and low attrition loss when subjected periodically to temperatures of 980° C, whereas a similar product made from unfired gibbsite (61.3% gibbsite, and 38.7% microcrystalline boehmite) did not retain sufficient strength for commercial utility when periodically subjected to temperatures of 980° C.

Attrition Loss Test

In this test 60 milliliters of the material to be tested is weighed and placed in an inverted 1000 ml. borosilicate glass Erlenmeyer flask, 8¾" ± ⅛" in height. The flask is provided with a 1 inch diameter hole in its bottom from which projects a 1 inch diameter, 6 inch long cylinder made of 14 mesh metal screen, with its outer end crimped to seal. Sealed to the mouth of the flask is a brass plug having a central passage 5/32" ± 0.001" in diameter. Internally of the mouth of the flask the plug terminates 1½ inches from the mouth, with a conical recess, having an included angle of 45°. Connected to the orifice in the plug is a source of dry nitrogen. Nitrogen flow is adjusted to the point that allows some of the tested material to be periodically lifted into the lower region of the 14 mesh screen cylinder and return to the chamber every several seconds, the flow rate being between 3.5 and 4 cubic feet per minute, depending on the material density and geometry. The gas is allowed to flow for 5 minutes, at which time the sample is removed and again weighed. The percent impact abrasion is equal to 100 times the loss in weight of the sample, divided by the original weight of the sample. In order to standardize the water content of the samples the material to be tested is heated at 1000° F for one hour, then cooled to 300° F in a circulating air oven, and finally sealed in a bottle and cooled to room temperature. The sample is then ready for testing.

Abrasion Loss Test

In this test a 160.0 gram sample of the material (which has been cleaned of fines by gentle shaking on an 8 mesh Tyler Screen, followed by tapping on a 28 mesh screen) is weighed and then placed in a Tyler 28 mesh screen (or U.S. No. 30) and shaken for 30 minutes in a standard Ro-Tap sieve shaker. The percent abrasion loss is equal to 100 times the weight of the material which has passed through the screen divided by the sum of the weight of the material remaining on the screen and the weight of the material which has passed through the screen.

The Ro-Tap test machine is available from the W. S. Tyler Company, Cleveland, Ohio.

Pore Volume by Water Adsorption

In this test, to standardize the samples, the material is calcined for one hour at 900° F, and then placed in a desiccator to cool.

To 5.0 grams of sample in a shallow aluminum weighing dish is added distilled water in the amount of 10 ml. (enough to cover the sample). The sample is allowed to stand 2 minutes, the water is poured off, and the sample blotted lightly with a damp cloth to remove surface moisture. The pore volume is calculated as the quotient of the weight of adsorbed water (weight of saturated sample minus weight of dry sample) divided by the weight of the dry sample, in cubic centimeters per gram.

What is claimed is:

1. A method of making a high purity alumina body consisting of providing a mix of
    (1) 30 to 80 parts of gibbsite fired to an L.O.I. of less than 8%, said fired material containing chi alumina or its thermal transition products
    (2) 20 to 40 parts of microcrystalline boehmite
    (3) 0 to 50 parts of desensitized microcrystalline boehmite
adding to said mix from 2 to 10% by weight of acid selected from the monobasic acids having an anion no larger than that of propanoic acid, and from 80 to 120 parts of water per 100 parts by weight of mix, mixing to provide a free flowing mix, forming shapes by pressure from said mix, drying said shapes to remove at least 80% of the added water, and firing said shapes at a temperature of from 625° to 1200° C, whereby the body has a surface area of from 70 to 220 square meters per gram and a crushing strength for 0.1 inch diameter pellets of greater than 7 pounds.

* * * * *